United States Patent
Kikuchi et al.

(10) Patent No.: US 11,417,185 B2
(45) Date of Patent: Aug. 16, 2022

(54) COMMUNICATION MANAGEMENT SYSTEM OF SURVEYING INSTRUMENT

(71) Applicant: TOPCON CORPORATION, Tokyo (JP)

(72) Inventors: Takeshi Kikuchi, Tokyo (JP); Mitsutaka Kagata, Tokyo (JP); Sora Otaguro, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 441 days.

(21) Appl. No.: 16/606,034

(22) PCT Filed: Jun. 14, 2018

(86) PCT No.: PCT/JP2018/022714
§ 371 (c)(1),
(2) Date: Oct. 17, 2019

(87) PCT Pub. No.: WO2019/003937
PCT Pub. Date: Jan. 3, 2019

(65) Prior Publication Data
US 2020/0143647 A1    May 7, 2020

(30) Foreign Application Priority Data

Jun. 28, 2017   (JP) .............................. JP2017-125780

(51) Int. Cl.
*G08B 13/22*  (2006.01)
*G01S 19/51*  (2010.01)
*G01C 15/00*  (2006.01)

(52) U.S. Cl.
CPC .............. *G08B 13/22* (2013.01); *G01S 19/51* (2013.01); *G01C 15/002* (2013.01)

(58) Field of Classification Search
CPC ...................................................... G01S 19/51
(Continued)

(56) References Cited

U.S. PATENT DOCUMENTS

| 2006/0016085 A1* | 1/2006 | Imamura | G01C 15/00 33/290 |
| 2012/0133918 A1* | 5/2012 | Sakimura | G01C 15/002 356/4.01 |

(Continued)

FOREIGN PATENT DOCUMENTS

| JP | 6-241802 A | 9/1994 |
| JP | 2006-38581 A | 2/2006 |

(Continued)

*Primary Examiner* — Bo Fan
(74) *Attorney, Agent, or Firm* — Roberts Calderon Safran & Cole P.C.

(57) ABSTRACT

In order to achieve the object described above, a communication management system includes: a surveying instrument including a survey unit, a GPS device, a control unit, and a communication unit; a management server capable of communicating with the surveying instrument; and a remote terminal capable of communicating with the management server, wherein the remote terminal sets a usable range of the surveying instrument, and sets determination on entrance and exit of the surveying instrument into and from the usable range, and an operation responsive to results of the determination, and makes the management server store these, the surveying instrument transmits own GPS information to the management server, and the management server compares entrance and exit of the surveying instrument into and from the usable range with the GPS information and executes the determination, and executes the operation based on results of the determination.

2 Claims, 4 Drawing Sheets

(58) Field of Classification Search
USPC .............................. 342/357.34, 357.27, 452
See application file for complete search history.

(56) References Cited

U.S. PATENT DOCUMENTS

2013/0109375 A1    5/2013   Zeiler et al.
2015/0240988 A1    8/2015   White

FOREIGN PATENT DOCUMENTS

| JP | 2007-170978 A | 7/2007 |
| JP | 2012-117874 A | 6/2012 |
| JP | 2016-223904 A | 12/2016 |

* cited by examiner

COMMUNICATION MANAGEMENT SYSTEM OF SURVEYING INSTRUMENT

CROSS-REFERENCE TO RELATED APPLICATIONS

The present application is a U.S. National Phase of PCT/JP2018/022714 filed on Jun. 14, 2018 claiming priority to Japanese Patent Application No. 2017-125780 filed on Jun. 28, 2017. The disclosure of the PCT Application is hereby incorporated by reference into the present Application.

TECHNICAL FIELD

The present invention relates to a communication management system configured to prevent an unauthorized use of a surveying instrument.

BACKGROUND ART

A surveying instrument (total station) is an apparatus to survey a target by irradiating distance-measuring light onto the target placed at a measurement point and receiving light reflected from the target. Since surveying instruments are expensive apparatuses, they are often targets of theft.

To counter theft, the system disclosed in Patent Literature 1 is configured to transmit a serial number unique to a surveying instrument from the surveying instrument to a management company. When receiving a report of a theft of a surveying instrument from an owner of the surveying instrument, the management company compares the serial number of the surveying instrument and a serial number in a database, and when these numbers match, a management command is transmitted from the management company to the surveying instrument, and the functions of the surveying instrument are suspended.

CITATION LIST

Patent Literature

[Patent Literature 1] Japanese Published Unexamined Patent Application Publication No. 2007-170978

SUMMARY OF THE INVENTION

Technical Problem

Although a system configured to counter theft by using a number unique to a surveying instrument as described above is conventionally available, in this system, it is necessary that the owner knows that the apparatus has been stolen and reports the stolen apparatus to the management company, and the management company makes a response. Therefore, a time lag tends to occur between the time of the occurrence of the actual theft and a response to the theft.

An object of the present invention is to provide a communication management system of a surveying instrument, capable of quickly making a response to an unauthorized use including theft, etc., of the surveying instrument.

Solution to Problem

In order to solve the above-described problem, a communication management system according to an aspect of the present invention includes: a surveying instrument including a survey unit configured to survey a target, a GPS device configured to measure coordinates, a control unit configured to control the survey unit and the GPS device, and a communication unit configured to enable communication between the control unit and a communication network; a management server capable of communicating with the surveying instrument through the communication network; and a remote terminal capable of communicating with the management server, wherein the remote terminal sets a usable range of the surveying instrument, sets determination on entrance and exit of the surveying instrument into and from the usable range, and an operation responsive to results of the determination, and makes the management server store the usable range, the determination, and the operation, the surveying instrument transmits own GPS information to the management server, and the management server compares entrance and exit of the surveying instrument into and from the usable range with the GPS information and executes the determination, and based on results of the determination, executes the operation.

In the aspect described above, it is also preferable that, when the surveying instrument is determined to have exited from the usable range in the determination, as the operation, the server notifies an owner and/or an administrator of the surveying instrument of the exit, and/or gives a warning to the surveying instrument and/or suspends functions of the surveying instrument.

In the aspect described above, it is also preferable that the remote terminal sets the usable range by a figure arbitrarily drawn on a map displayed on a webpage, a latitude and a longitude, or an address.

Effect of Invention

The communication management system of the present invention enables a quick response to an unauthorized use of a surveying instrument.

DESCRIPTION OF EMBODIMENTS

Next, a preferred embodiment of the present invention is described with reference to the drawings.

(Entire Configuration of System)

Figure 1:
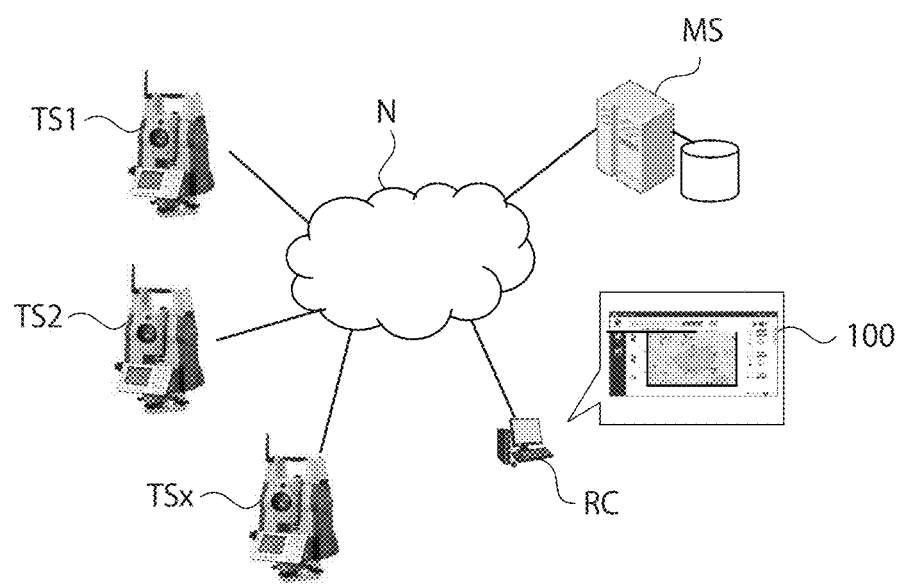
FIG. 1 is a view illustrating an entire configuration of a communication management system according to an embodiment of the present invention.

FIG. 1 is a view illustrating an entire configuration of a communication management system (hereinafter, simply referred to as a system) according to an embodiment of the present invention. In FIG. 1, reference signs TS1, TS2, and TSx (hereinafter, TS is used as a representative sign) denote some of a plurality of surveying instruments to be managed, and the reference sign MS denotes a management server, and the reference sign RC denotes a remote terminal. The surveying instruments TS1, TS2, and TSx, the management server MS, and the remote terminal RC are capable of communicating with each other via a communication network N such as the Internet. The communication network N may include arbitrary communication networks including a local area network such as an internal LAN, a connection cable, and a satellite communication network.

(Configuration of Surveying Instrument)

Figure 2:
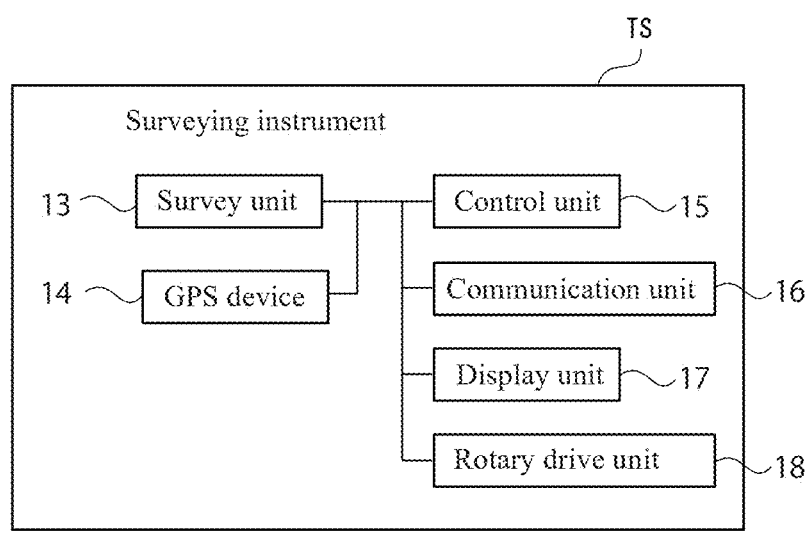
FIG. 2 is a configuration block diagram of a surveying instrument according to the embodiment.

FIG. 2 is a configuration block diagram of a surveying instrument according to the embodiment. The surveying instrument TS is a total station (electronic distance and angle measuring instrument). As illustrated in FIG. 2, the surveying instrument TS includes a survey unit 13, a GPS device 14, a control unit 15, a communication unit 16, a display unit 17, and a rotary drive unit 18. The surveying instrument may be configured so that the GPS device 14 and the communication unit 16 are retrofitted (externally fitted) to the surveying instrument TS.

The survey unit 13 includes a light emitting element, a distance-measuring optical system, and a light receiving element disposed inside a telescope (not illustrated) of the surveying instrument TS. The survey unit 13 emits distance-measuring light from the light emitting element via the distance-measuring optical system and receives reflected light from a target by the light receiving element to measure a distance to the target. The survey unit 13 measures a vertical rotation angle of the telescope and a horizontal rotation angle of a housing (not illustrated) of the telescope by rotary encoders.

The GPS device 14 receives a signal from a GPS satellite, and acquires GPS information (a time, a latitude, a longitude, and an altitude) of the surveying instrument TS.

The communication unit 16 enables communication with the communication network N, and makes a connection to the Internet by using, for example, an internet protocol (TCP/IP).

The display unit 17 has a liquid crystal screen, and survey conditions, etc., can be input therein, and various information on a survey are displayed. The rotary drive unit 18 is a motor, including a motor to vertically rotate the telescope and a motor to horizontally rotate the housing.

The control unit 15 is a control unit including at least a CPU and a memory (ROM, RAM, etc.). The control unit 15 executes a survey application program and makes the display unit 17 display a screen according to the application. The control unit 15 acquires survey data of a measurement point by performing automatic leveling, a distance measurement and an angle measurement of a target by driving the survey unit 13 and the rotary drive unit 18. In addition, the control unit 15 transmits and receives information to and from the management server MS through the communication network N by using the communication unit 16, and executes a command from the management server MS. Further, the control unit 15 transmits its own current GPS information acquired by the GPS device 14 to the management server MS. The GPS information is automatically transmitted when, for example, a power supply of the surveying instrument TS is turned ON or at a fixed frequency, for example, once an hour, or at least once a day. In the memory of the control unit 15, survey data and various programs for the above-described process are stored.

(Configuration of Remote Terminal)

Figure 3:
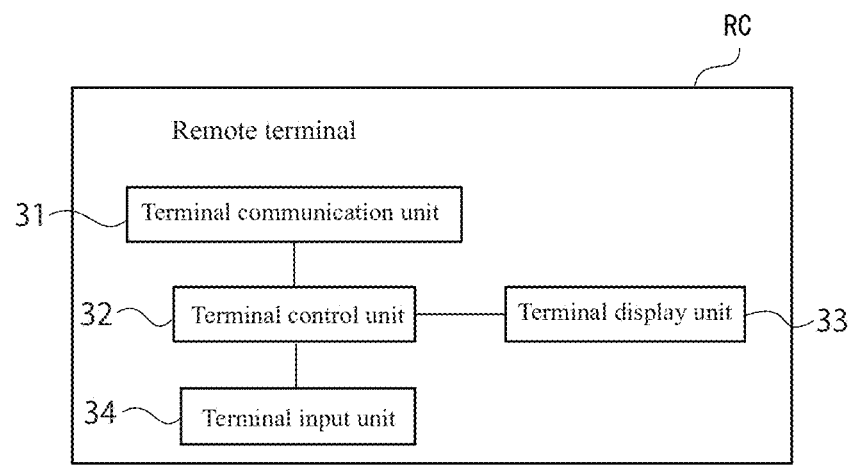
FIG. 3 is a configuration block diagram of a remote terminal according to the embodiment.

FIG. 3 is a configuration block diagram of a remote terminal according to the embodiment. The remote terminal RC is a terminal such as a personal computer, a smartphone, a tablet, etc., owned by a surveying instrument manufacturer or agent. The remote terminal RC includes at least a terminal communication unit 31, a terminal control unit 32, a terminal display unit 33, and a terminal input unit 34 as illustrated in FIG. 3.

The terminal communication unit 31 can transmit and receive information to and from a server communication unit 41 of the management server MS described below via the communication network N.

The terminal input unit 34 is, for example, a keyboard or the like, and can input the following settings.

The terminal control unit 32 is a control unit including at least a CPU and a memory (ROM, RAM, etc.). The terminal control unit 32 sets a usable range of a surveying instrument to be set this time (hereinafter, denoted by a reference sign TSx), by use of map information (a latitude and a longitude). In addition, the terminal control unit 32 sets determination on entrance and exit of the surveying instrument TSx into and from the set usable range. Also, the terminal control unit 32 sets an operation responsive to results of the determination. Hereinafter, these are described in detail.

Figure 4:
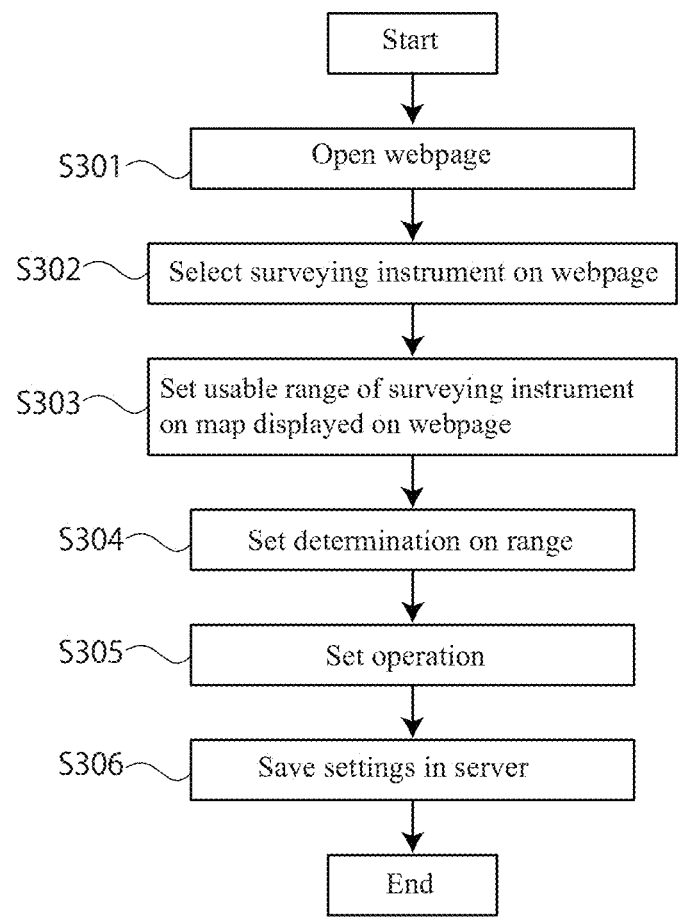
FIG. 4 is a flowchart at the time of setting of the communication management system according to the embodiment.

FIG. 4 is a flowchart at the time of setting of the communication management system according to the embodiment. First, in Step S301, an administrator of the surveying instrument TSx logs into an exclusive webpage 100 provided by a surveying instrument manufacturer from the remote terminal RC.

Next, when the process shifts to Step S302, a list of a plurality of registered surveying instruments is displayed on the terminal display unit 33, and the administrator selects a surveying instrument TSx to be set this time.

Next, when the process shifts to Step S303, a map around the surveying instrument TSx is read out. On the webpage 100, by a layer superimposed on the map, an interface to specify a range in which the surveying instrument TSx is usable is implemented. The displayed map can be changed in position or scale. The administrator sets a usable range of the surveying instrument TSx on the map displayed on the webpage 100.

Figure 5:
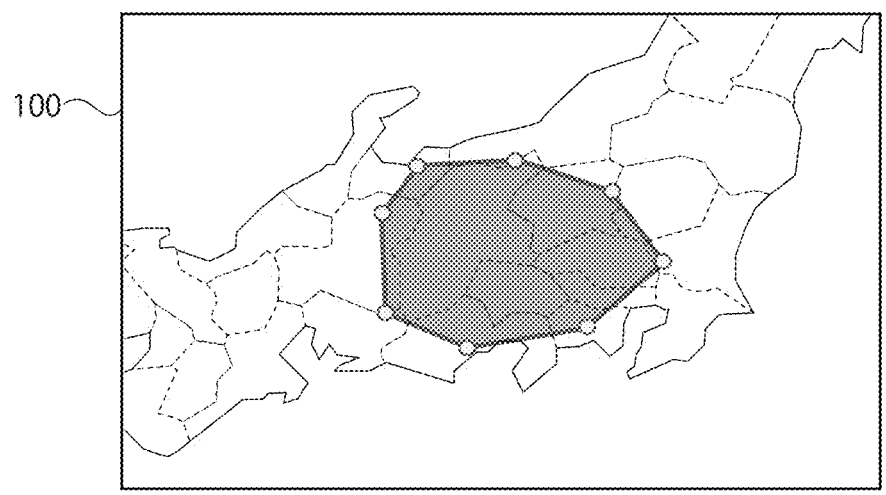
FIG. 5 is an example of a webpage at the time of setting.

FIG. 5 illustrates an example of the webpage at the time of setting, and is a setting example of a usable range of the surveying instrument TSx. A usable range of the surveying instrument TSx can be set to be an arbitrary range by a rectangle drawn by mouse clicking or a figure drawn freehand, as illustrated in FIG. 5. Besides these, the usable range may be numerically set by inputting, a latitude and a longitude, a radius from a center of the site, or an address, etc., into a text box displayed on the webpage 100. Map information of the usable range set on the webpage 100 is converted into a latitude and a longitude.

Next, when the process shifts to Step S304, a setting field for determination on the usable range set in Step S303 is displayed on the webpage 100. In the setting field for determination, for example, a plurality of options are displayed so as to be selectable by a pull-down menu method or check boxes. As options, for example, "When outside the range," "When inside the range," and "When outside the range from inside the range" and "when returning inside the range from outside the range," etc., are displayed. The configuration may be made so that the administrator can arbitrarily add options. The administrator sets determination (determination criteria) according to his/her own management intentions.

Next, when the process shifts to Step S305, a setting field for an operation responding to the determination set in Step S304 is displayed on the webpage 100. In the setting field for an operation, for example, a plurality of options are displayed so as to be selectable by a pull-down menu method or check boxes. As options, for example, "Send notification to registered e-mail address," "Notify on webpage," "Display warning on surveying instrument," and "Lock (suspend functions of) surveying instrument," etc., are displayed. The configuration may be made so that the administrator can arbitrarily add options. The administrator sets an operation or a plurality of operations according to his/her own management intentions.

Next, the process shifts to Step S306, and the terminal control unit 32 transmits information on the usable range, the determination, and the operation set in Step S303 to S305 described above to the management server MS via the terminal communication unit 31. The terminal control unit 32 ends the setting program when receiving a normal reception response from the management server MS.

(Configuration of Management Server)

Figure 6:
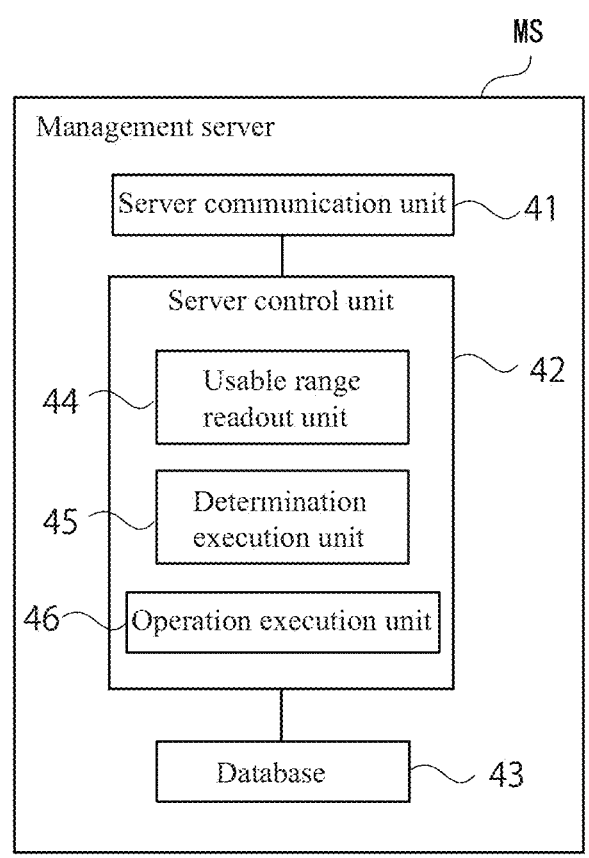
FIG. 6 is a configuration block diagram of a management server according to the embodiment.

FIG. 6 is a configuration block diagram of a management server according to the embodiment. The management server MS includes, as illustrated in FIG. 6, at least a server communication unit 41, a server control unit 42, and a database 43.

The server communication unit 41 can transmit and receive information to and from the communication unit 16 of the surveying instrument TS and the terminal communication unit 31 via the communication network N.

In the database 43, information received from the surveying instrument TS and the remote terminal RC are stored in association with a management number of the surveying instrument TS.

The server control unit 42 is a control unit including at least a CPU and a memory (ROM, RAM, etc.). The server control unit 42 includes, as illustrated in FIG. 6, a usable range readout unit 44, a determination execution unit 45, and an operation execution unit 46. The usable range readout unit 44 reads out a usable range of the surveying instrument TSx transmitted from the management server MS and stored in the database 43. The determination execution unit 45 executes determination on entrance and exit of the surveying instrument TSx into and from the usable range based on criteria transmitted from the management server MS and stored in the database 43 by comparing map coordinates (a latitude and a longitude) of the usable range of the surveying instrument TSx and GPS coordinates (a latitude and a longitude) of the surveying instrument TSx. The operation execution unit 46 reads out an operation transmitted from the management server MS and stored in the database 43, and executes the set operation based on results of the determination of the determination execution unit 45. Hereinafter, these are described in detail.

Figure 7:
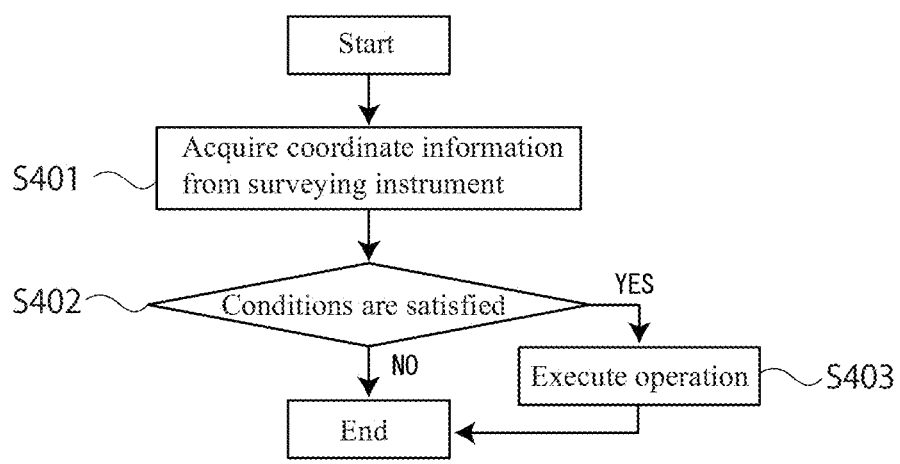
FIG. 7 is a process flowchart of the management server according to the embodiment.

FIG. 7 is a process flowchart of the management server according to the embodiment. First, in Step S401, the management server MS receives GPS information from the surveying instrument TSx.

Next, the process shifts to Step S402, the usable range readout unit 44 reads out a usable range of the surveying instrument TSx from the database 43, and the determination execution unit 45 determines entrance and exit of the surveying instrument TSx into and from the usable range. When a determination condition is not satisfied, the management server MS ends the process. On the other hand, when the determination condition is satisfied, the process shifts to Step S403, and the operation execution unit 46 executes a set operation. Then, the management server MS ends the process.

A usage example of the communication management system according to the embodiment is given. An example is given in which an administrator such as an agent does not want the surveying instrument TSx to be moved out of the vicinity of the site, and places restrictions by using this system.

(1) The administrator opens the webpage 100 on the remote terminal RC, and sets "Usable range: 100 m radius from the center of the site," "Determination: When outside the range," "Operation: Display warning on surveying instrument TSx and lock functions of surveying instrument TSx, and sends notification to the owner of the surveying instrument TSx by e-mail," saves these settings, and closes the webpage 100.

(2) The surveying instrument TSx transmits GPS information to the management server MS once an hour. When receiving the GPS information, based on GPS coordinates, the management server MS compares a position of the surveying instrument TSx and the usable range specified in (1). When the surveying instrument TSx is used inside the range, the management server MS transmits a normal response to the surveying instrument TSx, and the user can normally use the surveying instrument TSx.

Figure 8:
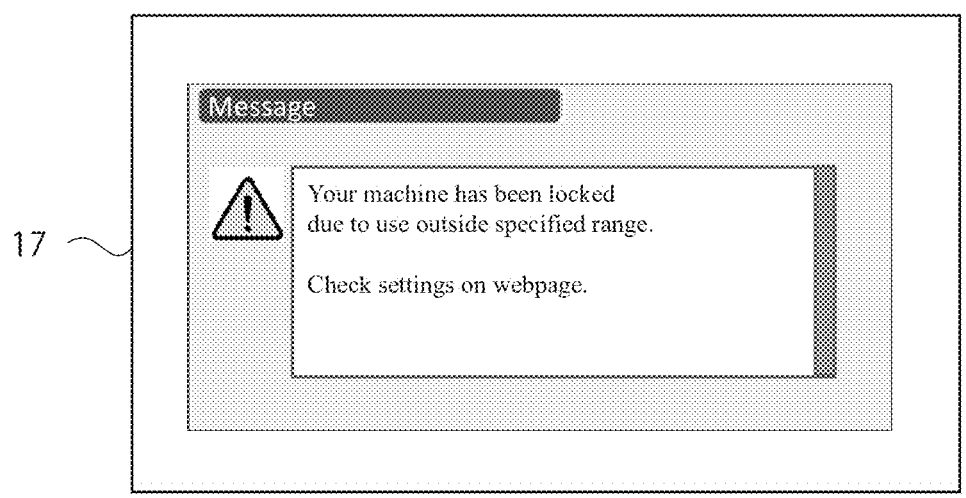
FIG. 8 is an example of a warning displayed on the surveying instrument according to the embodiment.

(3) On the other hand, when detecting a use outside the range, based on the operation set in (1), the management server MS commands the surveying instrument TSx to display a warning and lock its functions, and sends a notification that the surveying instrument TSx is being used outside the range to the owner by e-mail. The surveying instrument TSx that received the command from the management server MS displays a warning on the display unit 17, and subsequently, suspends operations except for turning-OFF of the power supply. FIG. 8 illustrates an example of a warning to be displayed on the surveying instrument according to the embodiment, and as the warning, a message such as "Your machine has been locked due to use outside specified range. Check settings on webpage." is displayed. The warning may be output by voice when the surveying instrument TSx is equipped with a speaker.

According to the communication management system of the present embodiment, by setting a usable range of the surveying instrument TSx, determination on entrance in and exit from the usable range, and an operation responsive to results of the determination in advance, the management server MS monitors entrance and exit of the surveying instrument TSx into and from the usable range. Then, in a case where the surveying instrument TSx is used at a location outside the usable range, the management server MS promptly makes a response. Therefore, when the surveying instrument TS is used at a location outside the usable range, an owner or an administrator can quickly find this fact.

When the surveying instrument TS is used at a location outside the usable range, the management server MS can automatically give a warning and lock the functions, so that a prompt response can be made to an unauthorized use such as theft or operator's use for improper purposes.

According to the communication management system of the present embodiment, the management server MS always monitors coordinates of a surveying instrument TS to be managed with time, so that it can be easily known when and where the surveying instrument TS is used. Therefore, the administrator can check an operation state of the surveying instrument TS in real time from the remote terminal RC, and can collectively manage a plurality of surveying instruments TS, so that asset management also becomes easy.

The preferred embodiment of the present invention is described above, and the embodiment can be modified based on knowledge of a person skilled in the art, and such a modified embodiment is also included in the scope of the present invention.

REFERENCE SIGNS LIST

TS Surveying instrument
RC Remote terminal
MS Management server
13 Survey unit
14 GPS device
15 Control unit
16 Communication unit
31 Terminal communication unit
32 Terminal control unit
33 Terminal display unit
34 Terminal input unit
41 Server communication unit
42 Server control unit
43 Database
44 Usable range readout unit
45 Determination execution unit
46 Operation execution unit
100 Webpage

The invention claimed is:

1. A communication management system of a surveying instrument, comprising:
   a surveying instrument including a survey unit configured to survey a target, a GPS device configured to measure coordinates, a control unit configured to control the survey unit and the GPS device, and a communication unit configured to enable communication between the control unit and a communication network;
   a management server capable of communicating with the surveying instrument through the communication network; and
   a remote terminal capable of communicating with the management server, the remote terminal being configured to set a usable range of the surveying instrument, set determination on entrance and exit of the surveying instrument into and from the usable range, and an operation responsive to results of the determination, and to make the management server store the usable range, the determination, and the operation, wherein
   the setting of the determination on entrance and exit includes at least the options of indicating when the surveying instrument is outside the usable range, when the surveying instrument is inside the usable range, when the surveying instrument is outside the usable range from inside the usable range, and when the surveying instrument is returning inside the usable range from outside the usable range, other options of the determination being arbitrarily addible by an administrator of the surveying instrument in accordance with the administrator's management intentions;
   the setting of the operation responsive to results of the determination includes at least the options of notifying the administrator, notifying an owner of the surveying instrument, displaying a warning with respect to the surveying instrument, and suspending functions of the surveying instrument, other options of the operation being arbitrarily addible by the administrator in accordance with the administrator's management intentions,
   the surveying instrument being configured to transmit own GPS information to the management server, and
   the management server being configured to compare entrance and exit of the surveying instrument into and from the usable range with the GPS information and to execute the determination, and based on results of the determination, to execute the operation.

2. The communication management system of a surveying instrument according to claim 1,
   wherein the remote terminal is configured to set the usable range by a figure arbitrarily drawn on a map displayed on a webpage, a latitude and a longitude, or an address.

* * * * *